US011664982B2

(12) United States Patent
Gryb et al.

(10) Patent No.: US 11,664,982 B2
(45) Date of Patent: May 30, 2023

(54) KEY MANAGEMENT FOR MULTI-PARTY COMPUTATION

(71) Applicant: Visa International Service Association, San Francisco, CA (US)

(72) Inventors: Oleg Gryb, San Francisco, CA (US); Sekhar Nagasundaram, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 17/276,620

(22) PCT Filed: Sep. 24, 2018

(86) PCT No.: PCT/US2018/052448
§ 371 (c)(1),
(2) Date: Mar. 16, 2021

(87) PCT Pub. No.: WO2020/068038
PCT Pub. Date: Apr. 2, 2020

(65) Prior Publication Data
US 2021/0273784 A1   Sep. 2, 2021

(51) Int. Cl.
*H04L 9/08* (2006.01)
(52) U.S. Cl.
CPC ............ *H04L 9/085* (2013.01); *H04L 9/0861* (2013.01); *H04L 9/0897* (2013.01); *H04L 2209/46* (2013.01)
(58) Field of Classification Search
None
See application file for complete search history.

(56) References Cited

U.S. PATENT DOCUMENTS

| 2011/0211692 | A1* | 9/2011 | Raykova ................. H04L 9/008 380/46 |
| 2012/0233460 | A1  | 9/2012 | Kamara et al. |
| 2013/0191632 | A1* | 7/2013 | Spector .................. H04L 9/085 713/155 |

(Continued)

FOREIGN PATENT DOCUMENTS

WO   WO-2016135738 A1 *   9/2016   ............. G06F 21/00

OTHER PUBLICATIONS

Mohassel, Payman and Rosulek, Mike and Zhang, Ye; Fast and Secure Three-Party Computation: The Garbled Circuit Approach; 2015; Association for Computing Machinery; https://doi.org/10.1145/2810103.2813705; pp. 591-602 (Year: 2015).*

(Continued)

*Primary Examiner* — Saleh Najjar
*Assistant Examiner* — Shadi H Kobrosli
(74) *Attorney, Agent, or Firm* — Kilpatrick Townsend & Stockton LLP

(57) ABSTRACT

Methods and systems for managing cryptographic keys in on-premises and cloud computing environments and performing multi-party cryptography are disclosed. A cryptographic key can be retrieved from a hardware security module by a key management computer. The key management computer can generate key shares from the cryptographic key, and securely distribute the key shares to computer nodes or key share databases. The computer nodes can use the key shares in order to perform secure multi-party cryptography.

20 Claims, 10 Drawing Sheets

(56) References Cited

U.S. PATENT DOCUMENTS

| | | | |
|---|---|---|---|
| 2016/0342608 A1* | 11/2016 | Burshteyn | H04L 63/0428 |
| 2017/0093879 A1* | 3/2017 | Dayka | H04L 63/0471 |
| 2017/0359321 A1* | 12/2017 | Rindal | H04L 9/008 |
| 2021/0111875 A1* | 4/2021 | Le Saint | H04L 9/085 |

OTHER PUBLICATIONS

Hamlin, Ariel and Schear, Nabil and Shen, Emily and Varia, Mayank and Yakoubov, Sophia and Yerukhimovich, Arkady; Cryptography for Big Data Security; http://www.c-is.cn/wp-content/uploads/2017/05/Cryptography-for-Big-Data-Security.pdf (Year: 2015).*

Jayaraman, Bargav; Li, Hannah; Evans, David; Decentralized Certificate Authorities; University of Virginia; Oct. 10, 2017, All Pages (Year: 2017).*

Archer et al., "From Keys to Databases—Real-World Applications of Secure Multi-Party Computation", International Association for Cryptologic Research, XP061025888, vol. 20180606:062214, Jun. 6, 2018, pp. 1-32.

EP18935825.2 , "Extended European Search Report", dated Aug. 13, 2021, 8 pages.

Mohassel et al., "Fast and Secure Three-party Computation the Garbled Circuit Approach", User Interface Software and Technology, XP058523669, Oct. 12, 2015, pp. 591-602.

International Search Report/Written Opinion for PCT Application No. PCT/US2018/052448 dated Jun. 14, 2019, 11 pages.

Y. Lindell, "Highly Efficient, Actively Secure, Three-Party Computation with Security Under One Corruption", Aug. 30, 2016, 14 pages.

Archer et al., "From Keys to Databases—Real-World Applications of Secure Multi-Party Computation", International Association for Cryptologic Research, 2018, 32 pages.

Mohassel et al., "Fast and Secure Three-party Computation: The Garbled Circuit Approach", Interface Software and Technology, Sep. 23, 2015, 18 pages.

SG11202102202R , "Written Opinion", dated Dec. 2, 2022, 8 pages.

* cited by examiner

KEY MANAGEMENT FOR MULTI-PARTY COMPUTATION

This application is a National Stage of International Application No. PCT/US2018/052448, filed Sep. 24, 2018, of which is herein incorporated by in its entirety.

BACKGROUND

Cryptography is used to maintain information security, which in turn is used for many communications made over networks such as the Internet. In most cryptosystems, a cryptographic key or cryptographic key pair are used to encrypt and decrypt messages. Provided the cryptographic keys are not stolen, parties can securely communicate with one another even in the presence of eavesdroppers. In computer systems, cryptography plays a critical role in password authentication, private messaging, and electronic commerce, among others.

Cryptographic keys can be stored in hardware security modules in order to prevent the cryptographic keys from being stolen. These hardware security modules can be physical computing devices that are designed to safeguard cryptographic keys, including secure crypto-processing chips.

However, in order to perform cryptographic operations, cryptographic keys usually need to be retrieved from a hardware security module. Usually, the cryptographic keys will be imported into a computing environment that is less secure than the hardware security module, increasing the risk that the cryptographic key is stolen or leaked to eavesdroppers each time the cryptographic key is retrieved.

Particularly, recent trends in software development have lead to the wide-spread adoption of third-party cloud computing systems. Rather than host applications or services on their own centralized network, organizations have increasingly hosted their services on third-party clouds. This poses security concerns, especially with regards to cryptographic operations or services.

Typically, in order to perform traditional cryptographic operations on a cloud platform, an organization has to relinquish their cryptographic key to a third party (i.e., the cloud provider) that the organization has no control over. The cryptographic key resides in memory in cloud infrastructure, and the organization has no guarantee that the cryptographic key cannot be retrieved by an eavesdropper or other malicious third party.

Alternatively, the cryptographic key can remain in the hardware security module and can be accessed by cloud-based cryptographic applications each and every time a cryptographic operation takes place. In this way, the cryptographic key is not transmitted into the cloud. However, the cryptographic key is exposed (however briefly) each and every time it is retrieved from the hardware security module. Additionally, latency and communication overhead can greatly increase the amount of time it takes to perform a cryptographic operation, greatly reducing the efficiency of the cryptographic service and increasing the cost of its implementation.

Embodiments of the invention address these and other problems, individually and collectively.

SUMMARY

Embodiments of the invention are directed to methods and systems for managing and distributing cryptographic key shares and performing secure multi-party encryption, both on-premises, and in distributed computing environments (such as cloud computing networks).

Embodiments make use of garbled circuits as part of a three-party Yao protocol in order to perform multi-party cryptography. A first computer node and a second computer node each provide a "garbled" key share to a third computer node, which uses the garbled key shares in order to encrypt an initial message using a garbled circuit. The first computer node and second computer node never see the key share belonging to the other computer node, and the third computer node only receives the key shares in garbled form.

In one embodiment, a key management computer can retrieve a cryptographic key from a hardware security module and generate a first and second key share based on the cryptographic key. The two key shares can be securely transmitted to a first and second computer node in a cloud computing environment, such that each computing node only receives its own key share and not the other key share. The two computing nodes, along with a third computing node can collectively perform a three-party Yao protocol using the two key shares to encrypt and decrypt messages received from client computers.

In another embodiment, a key management computer can retrieve a cryptographic key from a hardware security module and generate a first and second key share based on the cryptographic key. The first and second key shares can be securely transmitted to a first key share database and a second key share database. The first and second computing nodes can each retrieve a key share from the respective database. The two computing nodes, along with a third computing node can collectively perform a three-party Yao protocol using the two key shares to encrypt and decrypt messages received from a client computer.

Embodiments of the present disclosure provide a number of advantages with regard to the security, efficiency, and speed of cryptographic operations.

For example, embodiments of the present disclosure provide a number of security benefits. By splitting or otherwise separating the cryptographic key into key shares, the only place the cryptographic key is stored in its entirety is on the hardware security module. This makes it considerably more difficult for a hacker or other malicious user to acquire the cryptographic key, as the hacker needs to compromise multiple computer nodes, retrieve the key shares from those computer nodes, and determine how to recombine the key shares to generate the key. Further, in cloud computing based embodiments, the whole key never enters the perimeter of the cloud computing environment. As a result, there is no risk of the entire key being intercepted during the key share provisioning process. Further, unlike conventional systems, where a cryptographic key is received by a computer node before being split into key shares, embodiments of the present disclosure generate key shares before provisioning them to each computer node. As a result, each computer node participating in the multi-party computation does not see the key shares belonging to the other computer nodes, and consequently there is less risk of the cryptographic key being intercepted by a hacker.

Additionally, embodiments of the present disclosure improve efficiency by decreasing the reliance on hardware security modules. In two embodiments discussed below, the hardware security module is accessed only once in order to provision the key shares to participating computer node, reducing the role of the hardware security module to cryptographic key storage. As a result, the speed of the cryptographic process is improved, relative to conventional remote hardware security module encryption, as participating computer nodes spend less communicating with and waiting on the hardware security module to complete cryptographic operations. Further, in some on-premises related embodiments, hardware security module utilization is further reduced by pre-loading key shares directly to databases.

As another benefit, embodiments of the present disclosure can be used as extensible key management for any application or service running in a cloud computing environment without a cloud-based hardware security module. Not all conventional cloud computing environments provide cloud-hosted hardware security modules. However, using embodiments of the present disclosure, cryptographic operations can be performed and cryptographic keys and key shares can be managed even in the absence of a cloud-based hardware security module.

One embodiment is directed to a method comprising: receiving, by a first computer node, a first key share from a key management computer; receiving, by the first computer node, an initial message from a client computer; transmitting, by the first computer node, the initial message to a second computer node; generating, by the first computer node, a garbled circuit, a garbled first key share based on the first key share and the garbled circuit, and a garbled message based on the initial message and the garbled circuit; transmitting, by the first computer node to a third computer node, the garbled circuit, the garbled first key share, and the garbled message, wherein the third computer node also receives, from the second computer node, a garbled second key share based on a second key share stored at the second computer node and the garbled circuit, which causes the third computer node to generate a subsequent message by inputting the first garbled key share, the second garbled key share, and the garbled message to the garbled circuit, and transmit the subsequent message to the first computer node; and transmitting, by the first computer node, the subsequent message or a derivative thereof to the client computer.

Another embodiment is directed to a first computer node comprising: a processor; and a non-transitory computer readable medium coupled to the processor, the non-transitory computer readable medium comprising code, executable by the processor for implementing the above-noted method.

Another embodiment is directed to a method comprising: receiving, by a third computer node, from a first computer node, a first garbled circuit, a garbled first key share, and a first garbled message; receiving, by a third computer node, from a second computer node, a second garbled circuit, a garbled second key share and a second garbled message; generating, by the third computer node, a subsequent message by inputting the first garbled key share, the second garbled key share, and the first or the second garbled message to the first or the second garbled circuit; and transmitting, by the third computer node, the subsequent message to the first computer node.

Terms

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "cryptographic key" may include something used in encryption or decryption. In some cases, a cryptographic key may be the product of two large prime numbers. A cryptographic key may be used as an input in a cryptographic process, such as the RSA or AES cryptosystem. A cryptographic key can be used to encrypt plaintext and produce ciphertext, or decrypt ciphertext and produce plaintext.

"Plaintext" may include text that is in plain form. For example, plaintext can refer to text that is readable by a human or computer without any processing, such as the phrase "hello, how are you?" Plaintext may also refer to text that is in unencrypted form. Numbers or other symbols may also qualify as plaintext.

"Ciphertext" may include text that is in encrypted form. For example, ciphertext can refer to text that must be decrypted before it can be interpreted by a human or a computer. Ciphertext may be generated by a cryptosystem, such as RSA or AES.

A "multi-party computation" may include a computation performed by multiple parties. Each party may contribute some inputs to the computation. For example, two parties may each possess a key share, and may collectively perform encryption using the two key shares.

"Secure multi-party computations" may include multi-party computations that are secure. In many cases, a secure multi-party computation may refer to a multi-party computation in which the parties do not share their inputs with one another. For example, two parties may each possess a key share, and may collectively perform encryption using the two key shares, without revealing their respective key shares to the other party.

A "computer node" may include a node in a computer network. A computer node may be a computer, such as a server computer that communicates with client computers in a computer network. A computer node may be a physical computer, virtual machine, or another emulation of a computer system. In some cases, a computer node may be an application or program operating on a computer, which may communicate with other computer nodes in a network.

"Boolean algebra" or "Boolean logic" may include a branch of algebra where the values of variables are the truth values TRUE and FALSE, usually denoted 1 and 0 respectively. Boolean logic operators include AND, OR, and NOT. Boolean logic may be used to implement Boolean gates (also referred to as "logic gates") and Boolean circuits (also referred to as "logical circuits")

A "Boolean gate" (or "logic gate") include a device or software that performs a Boolean function, such as AND, OR, NOT, NAND, XOR, etc. A Boolean gate may have a number of "input wires" used to input the arguments of the Boolean function and a number of "output wires" used to output the result. For example, a two-terminal AND gate may have two input wires and a single output wire. The value of the output wire may be TRUE only if the value of both input wires are TRUE. Physical Boolean gates may be constructed from collections of transistors (i.e., CMOS transistors). Boolean gates may also be emulated using software.

A "Boolean circuit" (or "logical circuit") may include a collection of interconnected Boolean gates that perform a more complex Boolean logic function. As an example, two AND gates and an OR gate could be connected to calculate the Boolean function F(A, B, C, D)=(A AND B) OR (C AND D), where each input wire corresponds to one of A, B, C, and D, and the output wire corresponds to F(A, B, C, D). Many mathematical functions can be evaluated using Boolean circuits.

A "garbled gate" may include a process or calculation with hidden or "garbled" meaning. A garbled gate may perform a Boolean function, wherein the inputs and outputs of the garbled gate are "garbled values" rather than traditional Boolean values. A garbled gate may be represented as an encryption table, and the garbled input values may be used as cryptographic keys to decrypt the output value of the gate.

A "garbled circuit" may include a collection of interconnected garbled gates used to perform a more complex function. A garbled circuit may be used in a secure multi-party computation in order to perform a function without revealing the garbled circuit's inputs to participating entities. For example, two parties may each possess a key share, and may garble their individual key shares (producing garbled values) in order to use the key shares as inputs to a garbled encryption circuit. Because the key shares are garbled, each party is unable to learn the other party's key share.

A "garbled value" may include a value with hidden or "garbled" meaning. A garbled value can include a random or seemingly random alphanumeric sequence. A garbled value may include the labels corresponding to input or output wires of garbled gates in a garbled circuit. A garbled value may be the input or output of a garbled circuit. The garbled value output can be ungarbled to produce the output of the function represented by the garbled circuit. Garbled values can be used in secure multi-party computations in order to maintain secrecy over the value of the inputs.

A "proxy" may include an entity or device that represents or acts as an intermediary for another entity or device. For example, a proxy server may act as an intermediary for a client computer that is requesting a service from a service computer. A proxy may be used to restrict or otherwise perform access control for communications between entities.

An "on-premises zone" may include a collection of computers or devices operating on a premises. These may include computers owned or operated by an entity or organization that owns or manages the premises. For example, an organization may operate a web service, such as a video streaming service, and may operate the web service from a collection of server computers housed "on-premises" at a building owned by the organization.

A "restricted zone" may include a collection of computers or devices for which access to those devices or computers is controlled. For example, a restricted zone may comprise a network of computers that perform sensitive operations or store sensitive information, such as personally identifying information or cryptographic keys. Communications between computers or devices operating in the restricted zone and operating outside the restricted zone may be controlled or monitored. For example, only certain computers, entities, or devices may be allowed to communicate with computers or devices operating in the restricted zone.

A "hardware security module" may include a physical computing device used to store, protect, and manage cryptographic keys. A hardware security module may provide some cryptoprocessing functions, and may possess one or more cryptoprocessing chips for that purpose. A hardware security module may be in the form of a plug-in card or an external device that connects directly to a computer or network server. A hardware security module may be certified to a standard such as FIPS 140, and may be designed to be tamper resistant.

A "distributed computing network" or "cloud computing network" may include a shared pool of configurable computer system resources. A distributed computing network may comprise a distributed collection of infrastructure, including server computers, memory storage, and networking infrastructure, as well as platform resources such as databases and applications. In a distributed computing network, a number of computer nodes may communicate with one another, in order to provide some service to client computers.

DETAILED DESCRIPTION

Embodiments of the present disclosure are directed to methods and systems for securely distributing cryptographic key shares to computer nodes and performing secure multi-party encryption and decryption using those key shares and computer nodes. These methods and systems can be used both in on-premises environments and in cloud or distributed computing environments. Embodiments make use of a three-party Yao protocol and garbled circuits, in order to perform cryptography without risking the disclosure of sensitive key shares.

Generally, a key management computer can retrieve a cryptographic key from a hardware security module and generate two key shares, which can be securely provisioned to a first computing node and a second computing node or a first key share database and a second key share database. The first computing node, second computing node, and a third computing node can collectively perform secure multi-party encryption or decryption on a message received from a client computer or application.

The first computer node, second computer node, and third computer node collectively perform encryption or decryption using a three party Yao protocol, a method involving the use of a garbled circuit. The first computer node and second computer node each provide garbled versions of the respective key shares to the third computer node, and the third computer node performs the encryption or decryption operation using a garbled circuit. The key shares remain isolated from one another, and none of the first computer node, second computer node, or third computer node ever possess both key shares. The result of the encryption or decryption operation is transmitted back to the client computer or client application.

Figure 1:
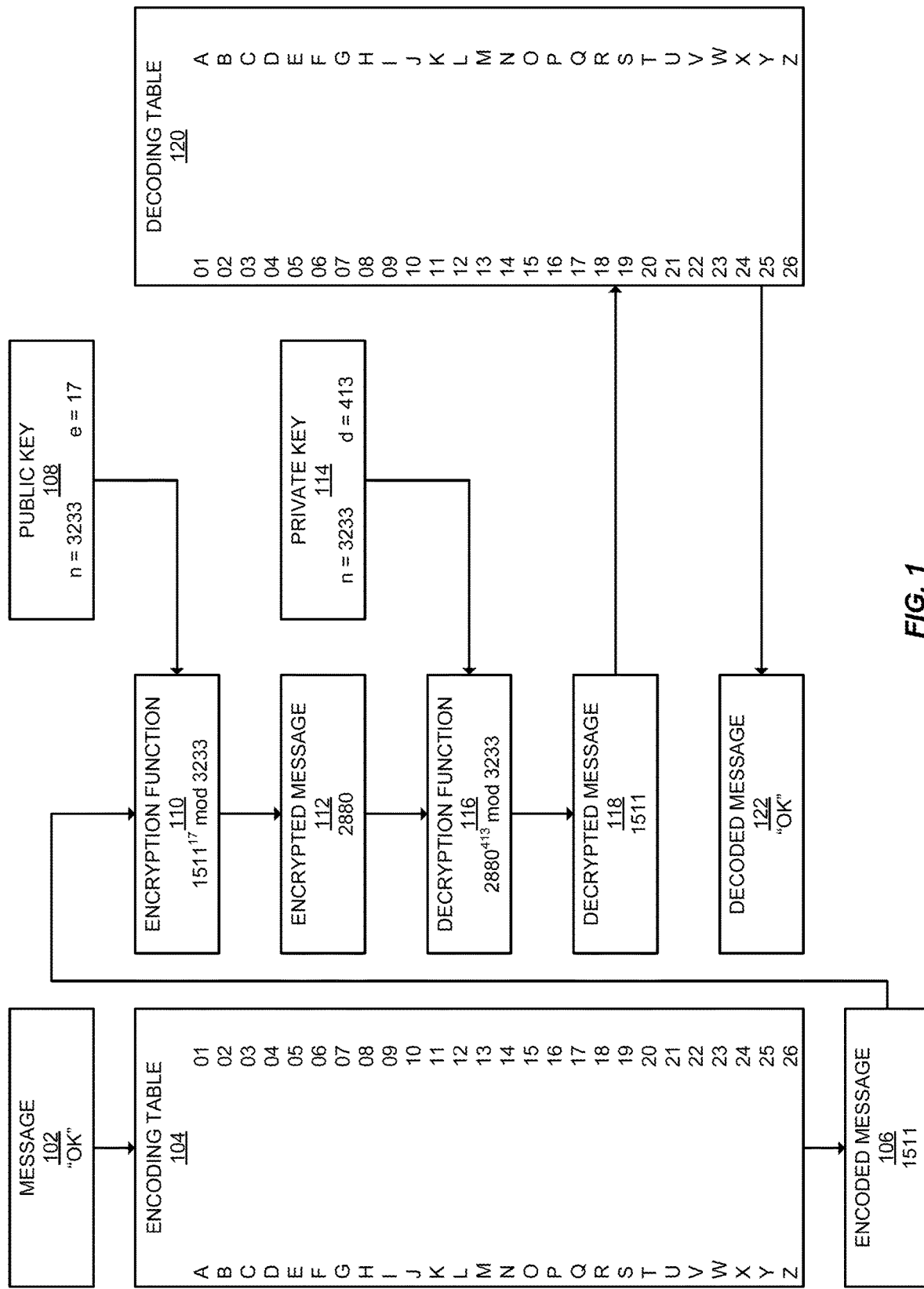
FIG. 1 shows a flowchart demonstrating an exemplary encryption process.
Figure 2:
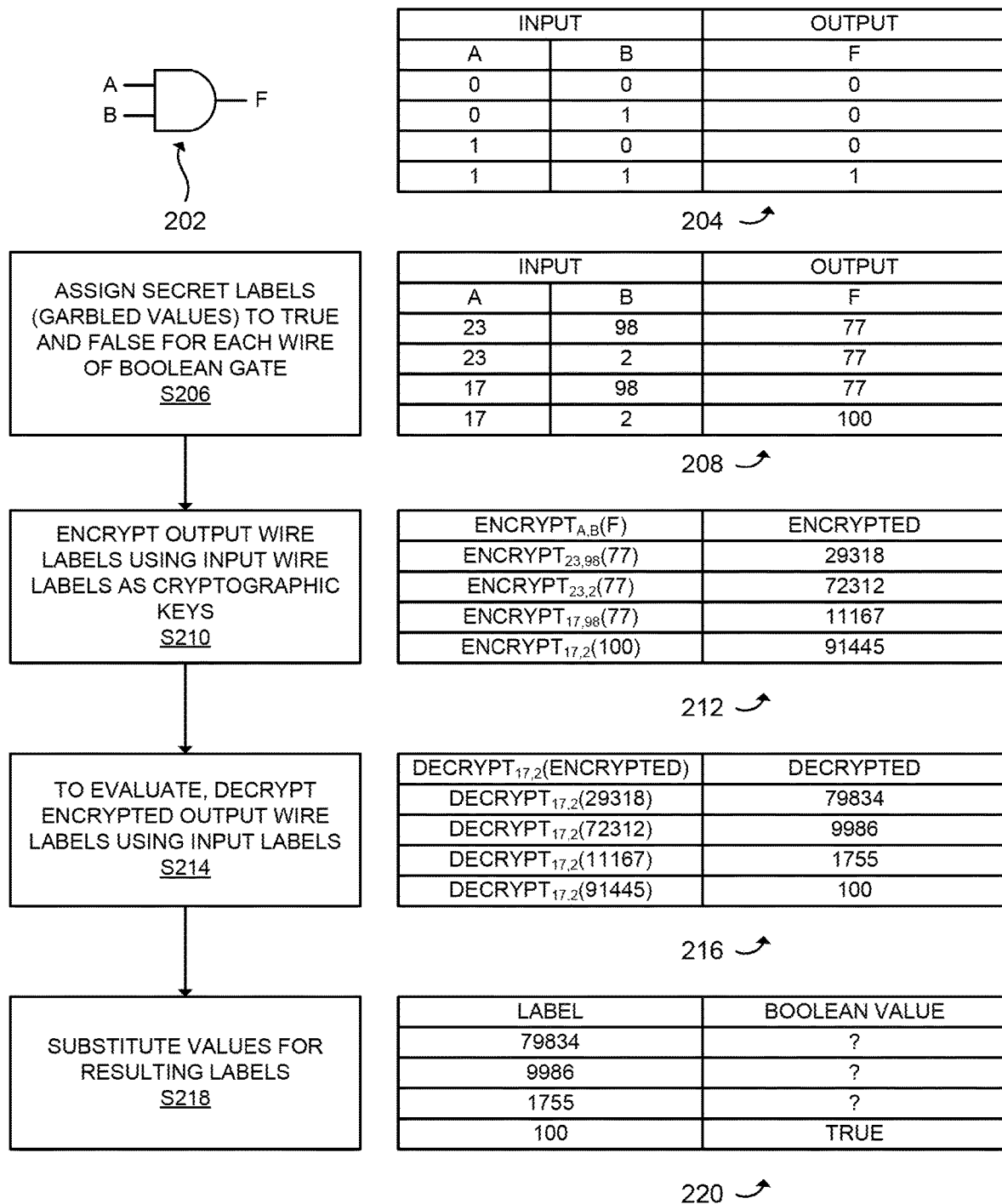
FIG. 2 shows a flowchart demonstrating an exemplary method used to generate a garbled gate.
Figure 3:
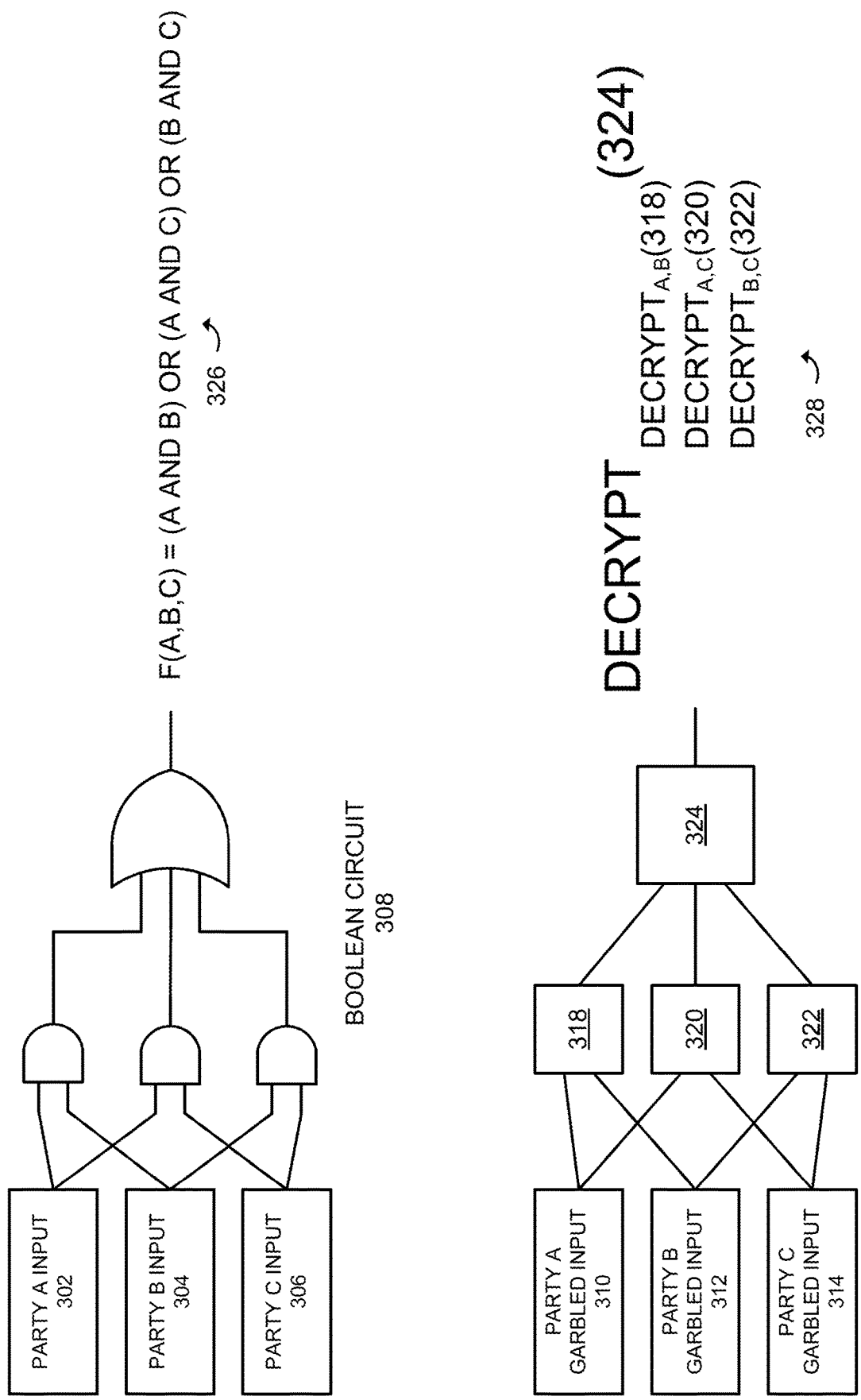
FIG. 3 shows a diagram of an exemplary Boolean circuit and equivalent garbled circuit.

Before describing systems and methods according to embodiments of the present disclosure, FIGS. 1-3 may be useful in understanding cryptography, garbled gates, and garbled circuits, which may be useful in understanding embodiments of the present disclosure.

FIG. 1 shows a flowchart diagram of an asymmetric encryption process that may be useful in understanding some embodiments. FIG. 1 details how a message 102 "OK," may be encoded and encrypted using a public key, before being decrypted using a private key and decoded, according to the RSA cryptosystem.

Message 102 can be encoded using an encoding table such as encoding table 104. Encoding table 104 pairs each letter with its alphabetical index in the English alphabet. "O" is the $15^{th}$ letter in the English alphabet, and "K" is the $11^{th}$ letter. Using encoding table 104, "OK" can therefore be encoded as 1511 (encoded message 106).

The RSA (Rivest-Shamir-Adleman) cryptosystem can use two distinct cryptographic keys, a public key and a private key. Messages encrypted using the public key can be decrypted using the private key. The public key and the private key each comprise two values, a modulus and an exponent. The modulus is a product of two prime numbers. In FIG. 1, the modulus n is 3233. The public exponent e and the private exponent d are selected based on the modulus. Typically, the public exponent e is selected to be less than and coprime with Carmichael's totient function, and the private exponent d is the modular multiplicative inverse of e. In FIG. 1 the public exponent e is 17 and the private exponent d is 413.

The encoded message 106 along with public key 108 are used as an input to the encryption function 110. The encoded message 106 "1511" is raised to the power of the public exponent e=17, and the modulus of the result and n=3233 is determined. The result is the encrypted message 112, 2880.

The encrypted message 112 can be decrypted using the decryption function 116 and private key 114. The decryption function 116 is similar to the encryption function 110. The encrypted message 112, 2880 is raised to the power of the private exponent d=413, and the modulus of the result and n=3233 is determined. The result is the decrypted message 118, 1511. Notably, the decrypted message 118 is the same as encoded message 106, indicating that the encryption and decryption process was successful.

The decrypted message 118 can be decoded using a decoding table 120, which pairs alphabetic indexes to the corresponding letter of the English alphabet. "15" corresponds to the letter "O" and "11" corresponds to the letter "K." The resulting decoded message 122 is "OK," which is the same as message 102.

FIG. 2 shows an exemplary method of generating a garbled gate corresponding to a Boolean gate, which may be useful in understanding garbled gates, garbled circuits, and some embodiments of the present disclosure.

"AND" gate 202 comprises two input wires A and B, and an output wire F. The output wire F has a Boolean value of TRUE if both input wires A and B have a Boolean value of TRUE, and has a value of FALSE otherwise. The behavior of the AND gate is summarized in truth table 204, where 0 corresponds to the Boolean value FALSE, and 1 corresponds to the Boolean value TRUE.

A collection of Boolean logic gates, such as "AND" gate 202 can be used to build a Boolean circuit. In a Boolean circuit, the outputs of Boolean logic gates and inverters feed into the inputs of subsequent Boolean logic gates. Many mathematical functions can be performed using Boolean circuits, such as encryption. AES encryption, for example, can be performed using a Boolean circuit comprising approximately 32,000 Boolean logic gates.

However, garbled circuits can be used instead of Boolean circuits in order to perform functions such as encryption. Just as Boolean circuits can be built from Boolean gates, garbled circuits can be built from garbled gates. Garbled gates can be used to perform the functions of Boolean gates, but also have the added advantage of keeping the inputs and the output of the garbled gate secret. A garbled circuit can be used e.g., to perform encryption while maintaining the secrecy of the inputs, outputs and intermediate calculations. In this way, a garbled circuit can be used to perform multi-party encryption while keeping the message (input), key shares (inputs), and encrypted message (output) secret.

FIG. 2 shows a series of steps S206-S218 that can be used to generate a garbled gate corresponding to "AND" gate 202 and evaluate the result for a given set of inputs.

At step S206, secret labels can be assigned to TRUE and FALSE for each wire (A, B, and F) of "AND" gate 202. Table 208 summarizes the result. For input wire A, 23 has been assigned as the label for FALSE and 17 has been assigned the input label for TRUE. For input wire B, 98 has been assigned as the input label for FALSE and 2 has been assigned as the input label for TRUE. For output wire F, 77 has been assigned as the input label for FALSE and 100 has been assigned as the input label for TRUE. The labels can be selected such that it is difficult for an entity to determine or otherwise guess the relationship between a label and the corresponding Boolean value, e.g., the labels can be selected or generated using a random or pseudorandom number generator.

At step S210, the output label corresponding to each row of table 208 can be encrypted using the corresponding input labels as cryptographic keys. That is, output label 77 can be doubly encrypted using (23, 98), (23, 2), and (17, 98), and output label 100 can be doubly encrypted using (17, 2). The encrypted results are summarized in table 212.

At step S214, an evaluator (e.g., a third computer node, as described below) can evaluate the garbled gate by decrypting each of the four values with the labels corresponding to the evaluator's inputs. For example, in order to evaluate the output corresponding to the inputs TRUE and TRUE, the evaluator can decrypt each of these four encrypted values using 17 and 2 (the labels or "garbled inputs" corresponding to a Boolean value of TRUE on input wire A and a Boolean value of TRUE on input wire B). Table S216 summarizes the decrypted results. Notably, the decrypted value of the fourth row (100) is equal to the label corresponding to a Boolean value of TRUE on output wire F, while the decrypted value of the first three rows do not correspond to any wire label.

At step S218, the evaluator can substitute the values for the resulting labels. The first three values (79834, 9986, and 1755) do not correspond to a label, while the final value, 100, corresponds to the Boolean value TRUE on output wire F. Table 220 summarizes these results. In this way, a garbled gate can be generated from a corresponding Boolean gate, and can be used to perform the function of the Boolean gate while maintaining the secrecy of the inputs and outputs. The Boolean values of the inputs and outputs are only known if the labels corresponding to the inputs and outputs are known.

FIG. 3 may be useful in understanding some of the principles and applications of garbled circuits. FIG. 3 shows a Boolean circuit used to implement a three party majority vote. An input of TRUE can be interpreted as an affirmative vote, and an input of FALSE can be interpreted as a negative vote. The output of Boolean circuit 308 is TRUE if the vote passes, i.e., if at least two inputs from party A input 302, party B input 306, and party C input 306 are TRUE. Boolean circuit 308 implements Boolean function 326, i.e., F(A, B, C)=(A AND B) OR (A AND C) OR (B AND C).

For voting, it may be advantageous to keep the inputs (i.e., the votes) secret. This can be accomplished using a garbled circuit 316. The three AND gates and one OR gate of Boolean circuit 308 are replaced by four garbled gates 318-324 in garbled circuit 316.

As described with reference to FIG. 2, the inputs to each garbled gate are garbled values, which are used to decrypt the garbled gate in order to produce the output label. In garbled circuit 316, the outputs labels of each garbled gate 318, 320, and 322 are used as garbled values to decrypt the output label of garbled gate 324, which is the output label corresponding to the output of the entire garbled circuit. Party A garbled input 310 and party B garbled input 312 (shown as "A" and "B" in function 328) are used as cryptographic keys to decrypt garbled gate 318. The result is used as a cryptographic key to decrypt garbled gate 324. Party A garbled input 310 and party C garbled input 314 are used as cryptographic keys to decrypt garbled gate 320, and the result is likewise used as a cryptographic key to decrypt garbled gate 324. Likewise, party B garbled input 312 and party C garbled input 314 are used to decrypt garbled gate 322, the output of which is used as a cryptographic key to decrypt garbled gate 324.

The label produced by decrypting garbled gate 324 corresponds to the equivalent output of Boolean circuit 308. I.e., if two or more garbled inputs of garbled inputs 310, 312, and 314 correspond to a Boolean value of TRUE, the garbled output of garbled gate 324 will correspond to an output of TRUE.

Although a garbled circuit used to implement AES, RSA, or other forms of encryption. FIGS. 2 and 3 illustrate that collections of garbled gates can be used to form garbled circuits that implement more complex functions, such as secret majority voting and AES encryption.

Figure 4:
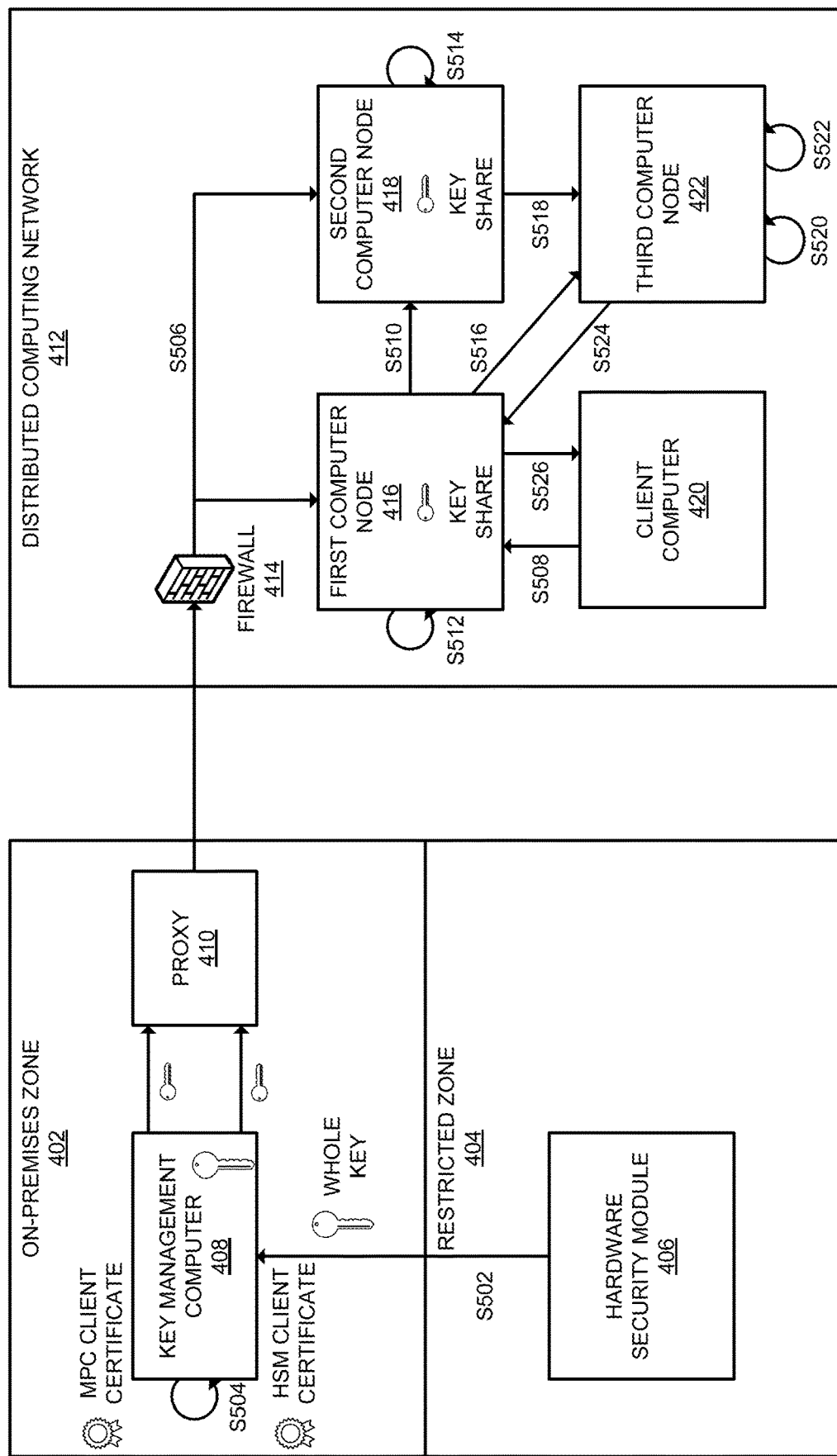
FIG. 4 shows a block diagram of a cloud-based key management and multi-party encryption system according to some embodiments.

FIG. 4 shows a system block diagram of a cloud-based key management system according to some embodiments. The system comprises an on-premises zone 402 and a distributed (or cloud) computing network 412. The on-premises zone may additionally comprise a restricted zone 404. Additionally shown in FIG. 4 are a series of steps S502-S526, which may be understood with reference to the flowchart of FIG. 5.

The on-premises zone 402 may comprise computers, servers, computational resources, and software, that are installed or operating on computers "on-premises." This may contrast with, e.g., computers, servers, computational resource, or software that are operating in a distributed (or "cloud") computing network 412. The on-premises zone 402 may include a key manager 408 and a proxy 410, as well as a restricted zone 404.

The restricted zone 404 may be a computing zone that is subject to higher security than the on-premises zone 402 and the distributed computing network 412. Access to computational resources in the restricted zone 404 may be restricted to a few trusted entities, including the key management computer 408. Communications with computers and other devices operating within restricted zone 404 may be subject to monitoring or any other appropriate security policies, including discretionary and mandatory access control. The restricted zone 404 may be subject to heightened security in order to protect cryptographic keys and other sensitive resources stored in hardware security module 406.

The hardware security module 406 may be used to securely store a cryptographic key (also referred to as the "whole key"). The hardware security module 406 may be a physical computing device that is tamper-protected, i.e., the hardware security module 406 may provide tamper evidence, or become inoperable or delete cryptographic keys if it is tampered with. The hardware security module 406 may include one or more secure cryptoprocessing chips, and may be present in a cluster of other hardware security modules. The hardware security module 406 may be accessed by the key management computer 408, in order for the key management computer 408 to retrieve the cryptographic key.

The key management computer 408 may have the ability to extract or import cryptographic keys from the hardware security module 406. The key management computer 408 may have secure communication capabilities that enable it to securely retrieve cryptographic keys from the hardware security module 406. These may include, for example, the capability to mutually authenticate and/or perform client certificate authentication. Additionally, the key management computer 408 may be able to generate a first key share and a second key share from the cryptographic key. The key management computer 408 may possess any appropriate code, instructions or software in order to generate key shares from the cryptographic key. It may also execute software or code that enables the key management computer 408 to perform functions involved in generating the first and second key shares, including generating cryptographically secure random numbers.

The following is intended only as a non-limiting example of generating key shares from a cryptographic key. It can be understood that there are many other appropriate methods that may be employed with embodiments of the present disclosure. The key manager 408 can generate a random or pseudorandom number. The key manager 408 can use this random or pseudorandom number as either the first or second key share. The key manager can calculate the XOR (exclusive or) of the random number and the cryptographic key. The XOR of the random number of the cryptographic key can be used as the other key share (e.g., the second key share).

The key management computer 408 may be able to securely transmit the first and second key shares to a first computer node 416 and a second computer node 418 in the distributed computing network 412. Communications between the key manager 408 and the first computer node 416 and second computer node 418 may be mediated or protected by a proxy 410 and a firewall 414.

Proxy 410 may restrict the connection between the on-premises zone 402 and the distributed computing network 412. The proxy may prevent computers or entities that are not the first computer node 416 or the second computer node 418 from communicating with the key management computer 408. Additionally, the proxy 410 may implement content filtering rules by analyzing network traffic between the key manager 408 and entities in the distributed computing network 412, including the firewall 414 or a cloud-based extensible key manager (not shown). Further, the proxy 410 may store and manage client side certificates used to authenticate against the first computer node 416 and the second computer node 418.

The distributed (or "cloud") computing network 412 may comprise a number of computer nodes, including first computer node 416, second computer node 418, client computer 402, and third computer node 422. Three of these nodes, the first computer node 416. The second computer node 418, and the third computer node 422 may collectively perform a three-party Yao protocol in order to encrypt or decrypt messages received from client computer 420. The distributed computing network 412 may be operated by a third-party, i.e., an entity other than the entity that owns, manages, or operates the on-premises zone 402.

The firewall 414 may act as a network security control by preventing access to entities or devices in the distributed computing network 412. In some embodiments, the firewall 414 may not allow any external entities, aside from proxy 410, from communicating with either the first computer node 416 or the second computer node 418.

The first computer node 416 may interface with client computer or application 420. The first computer node 416 may receive an initial message from client computer 420, and may generate a garbled circuit for the purpose of encrypting or decrypting the initial message. The first computer node 416 may generate a garbled circuit, garbled message, and garbled key share as part of the three-party Yao protocol. The first computer node 416 may transmit the initial message to the second computer node 418, and may transmit the garbled circuit, garbled message, and garbled key share to the third computer node 422, so that the third computer node 422 can encrypt or decrypt the initial message using the garbled circuit, garbled message, garbled first key share, and a garbled second key share received from the second computer node 418. The first computer node 416 may not receive the second key share stored by second computer node 418, and vis-versa. The first computer node 416 is discussed in further detail below with reference to FIG. 8.

The second computer node 418 may receive the initial message from the first computer node 416. The second computer node 418 may generate a garbled message based on the initial message, a garbled second key share, and a garbled circuit, and provide the garbled message, garbled second key share, and garbled circuit to the third computer node 422, in order for the third computer node 422 to encrypt or decrypt the initial message using the garbled circuit and generate a subsequent message. Generally, aside from interfacing with the client computer 420, the second computer node 418 performs similar functions to the first computer node 416, and can generally be understood with reference to FIG. 8 and the description below.

The client computer 420 may be a client computer or application requesting cryptoprocessing services from the first computer node 416. The client computer 420 may possess an initial message that the client computer 420 wants to be encrypted or decrypted. The client computer 420 may provide the initial message to the first computer node 416 and receive a subsequent message, or a derivative of the subsequent message from the first computer node 416. For example, the initial message may be a plaintext message, and the subsequent message may be an encrypted message corresponding to the plaintext message.

The third computer node 422 may evaluate a garbled circuit using a garbled first key share, a garbled second key share, and a garbled message in order to generate a subsequent message. Additionally, the third computer node 422 may verify that garbled circuits and garbled messages received from the first computer node 416 and the second computer node 418 are consistent. The third computer node 422 may perform the encryption or decryption operation requested by the client computer 420, using the first and second garbled key shares, but possesses neither of the key shares itself. The third computer node 422 can transmit the subsequent message back to the first computer node 416, which can ungarble the subsequent message (if necessary) and transmit the result back to the client computer 420. The third computer node 422 is discussed in further detail below with reference to FIG. 9.

Figure 5:
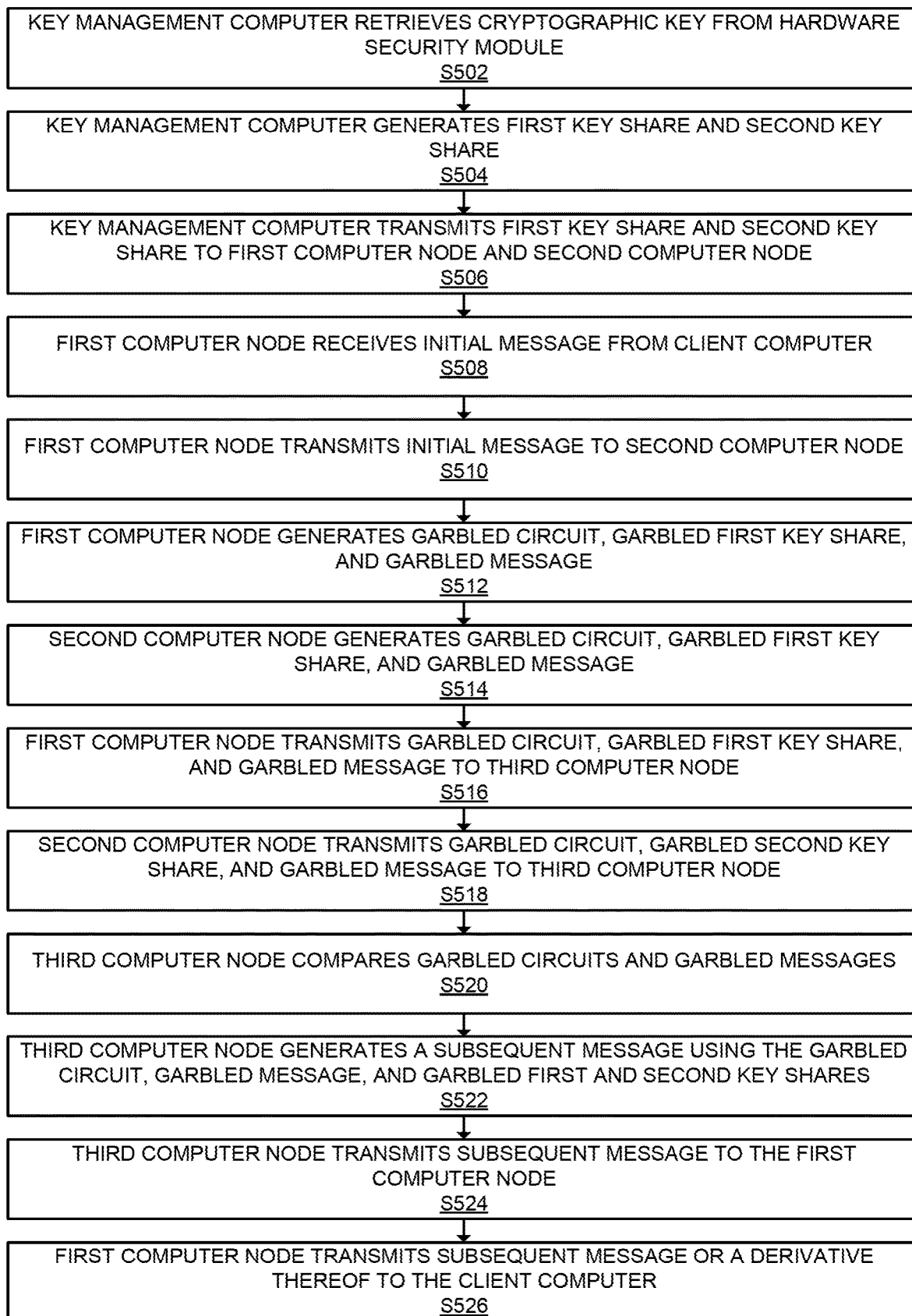
FIG. 5 shows a flowchart of a method of cloud-based key management and multi-party encryption according to some embodiments.

FIG. 5 shows a method of cloud-based key management and multi-party encryption according to some embodiments. The method may also be understood with reference to FIG. 4.

At step S502, the key management computer 408 can retrieve a cryptographic key stored in a hardware security module 406. In some embodiments, the key management computer 408 may first receive a request for key share provisioning from one or more entities, e.g., the first computer node 416 and the second computer node 418. The key management computer 408 may verify or authenticate the requestor using a client certificate, e.g., a certificate corresponding to one or more of the computer nodes performing multi-party cryptography (MPC client certificate). The key management computer 408 may additionally verify or authenticate the hardware security module 406, e.g., using an HSM client certificate. After performing any optional verification or authentication steps, the key management computer 408 may retrieve the cryptographic key from the hardware security module 406.

At step S504, the key management computer 408 may generate or form a first key share and a second key share from a key (i.e., the cryptographic key) stored in the hardware security module 406. There are a number of ways in which a cryptographic key can be used to generate two or more key shares. As one example, the key management computer 408 may generate a random number using any appropriate cryptographically secure random number generator and use the random number as one of the two key shares (e.g., the first key share). The key management computer 408 may calculate the XOR (exclusive-or) of the first key share and the cryptographic key from the hardware security module 406 and use the XOR of the first key share and the cryptographic key as the second key share. However, any appropriate secret sharing method may be used in order to generate the first and second key share from the cryptographic key, e.g., Shamir's secret sharing or the Chinese remained theorem.

At step S506, the key management computer 408 transmits the first key share and second key share to the first computer node 416 and the second computer node 418. The key management computer 408 may transmit the first key share and the second key share to the first computer node 416 and the second computer node 418 via proxy 410 and firewall 414, which may serve as access control or security for the key management computer 408 and distributed computing network 412 respectively. The first computer node 416 and second computer node 418 may verify proxy 410 using a proxy certificate, or any other appropriate authentication method. The first computer node 416 may receive the first key share from the key management computer 408 and the second computer node 418 may receive the second key share from the key management computer 408. Each computer node may not receive the key share corresponding to the other computer node. The first computer node 416 and second computer node 418 may securely store their respective key shares, e.g., in a secure memory element.

At step S508, the first computer node 416 can receive an initial message from a client computer 420. The initial message may comprise a message that the client computer 420 wants to encrypt or decrypt, e.g., the initial message may be plaintext or ciphertext. The initial message may additionally comprise information about the requested operation, e.g., whether the client computer 420 wants the message encrypted or decrypted. The client computer 420 and first computer node 416 may authenticate each other, mutually or otherwise, before the client computer 420 transmits the initial message to the first computer node 416.

At step S510, the first computer node 416 may transmit the initial message to the second computer node 418. In some embodiments, the second computer node 418 may generate a garbled circuit, garbled second key share, and garbled message. In these embodiments, the second computer node 418 may use the initial message to generate the garbled circuit, garbled second key share, and/or garbled message.

At step S512, the first computer node 416 may generate a garbled circuit, a garbled first key share based on the first key share and the garbled circuit, and a garbled message based on the initial message and the garbled circuit. In some embodiments, the first computer node 416 and second computer node 418 may generate garbled circuits and garbled messages in a consistent manner. The first computer node 416 and second computer node 418 may use the same algorithm or process to generate garbled circuits, such that the garbled circuits generated by each computer node are the same. Garbled circuit generation can be accomplished in a number of ways, and the following is intended as a non-limiting example.

The first computer node 416 may possess a template or file that defines a Boolean circuit or an unlabeled garbled circuit that may be used to perform encryption, e.g., a Boolean circuit that implements an encryption or decryption algorithm for the AES cryptosystem. The first computer node 416 may use a random number generator to generate the input and output wire labels corresponding to the garbled circuit. The first computer node 416 may generate the garbled first key share based on the first key share using some of the input wire labels. For example, if the first key share is 256 bits long, the garbled circuit may possess 256 input wires corresponding to the first key share. The garbled first key share may be generated based on the 256 input wire labels corresponding to the first key share. Likewise, the garbled circuit may possess some number of input wires corresponding to the initial message. The garbled message may be generated by determining the input wire labels corresponding to the initial message.

At step S514, the second computer node 418 may generate a second garbled circuit, a garbled second key share based on the second key share stored at the second computer node 418, and a second garbled message. The second computer node 418 may generate the second garbled circuit, garbled second key share, and second garbled message in substantially the same way as the garbled circuit, garbled first key share, and garbled message were generated by the first computer node 416.

At step S516, the first computer node can transmit the garbled circuit, garbled first key share, and the garbled message to the third computer node 422. In some embodiments, the garbled circuit may be referred to as a first garbled circuit and the garbled message may be referred to as a first garbled message.

At step S518, the second computer node 418 can transmit the second garbled circuit, garbled second key share, and the second garbled message to the third computer node 422.

At step S520, the third computer node 422 may determine that the first garbled circuit and the second garbled circuit match and the first garbled message and second garbled message match. The third computer node 422 may perform this verification in order to determine that the first computer node 416 and the second computer node 418 are in agreement over the multi-party cryptographic operation to be performed. The third computer node 422 may verify that the first garbled circuit and the second garbled circuit match and that the first garbled message and second garbled message match using any appropriate method. For example, the third computer node 422 may iterate through the first and second garbled message (and any files or data representing the first and second garbled circuit) and perform a bit-wise or byte-wise comparison in order to verify that the garbled messages and garbled circuits are consistent. Alternatively, the third computer node 422 can compare hashes of the two garbled circuits or garbled messages.

At step S522, the third computer node 422 can generate a subsequent message by inputting the first garbled key share, the second garbled key share, and the garbled message to the garbled circuit. The garbled circuit may comprise a number of input wires corresponding to the first key share, the second key share, and the garbled message. The third computer node 422 may use the labels corresponding to those input wires (i.e., the garbled first key share, the garbled second key share, and the garbled message) in order to decrypt the corresponding output wires, which may be used as labels to decrypt the output wires of successive garbled gates, as described above with reference to FIGS. 2 and 3. The result may be a set of output wire labels that correspond to a subsequent message.

At step S524 the third computer node 422 may transmit the subsequent message to the first computer node 416.

At step S526, the first computer node 416 may transmit the subsequent message or a derivative thereof to the client computer 420. In some embodiments, the subsequent message may be a set of output wire labels corresponding to the output of the garbled encryption or decryption circuit. The first computer node 416 may ungarble the message by replacing the labels with their corresponding Boolean values before transmitting the ungarbled message to the client computer 420. In some embodiments, the subsequent message or the derivative thereof is ciphertext (i.e., the garbled circuit was used to perform encryption). In other embodiments, the subsequent message or the derivative thereof is plaintext (i.e., the garbled circuit was used to perform decryption).

It can be that the steps of FIG. 5 can be performed in any suitable sequence or order, and steps may be omitted or added. For example, the first computer node 416 and second computer node 418 can generate the respective garbled circuits and garbled key shares before the first computer node 416 receives the initial message from the client computer 420.

Figure 6:
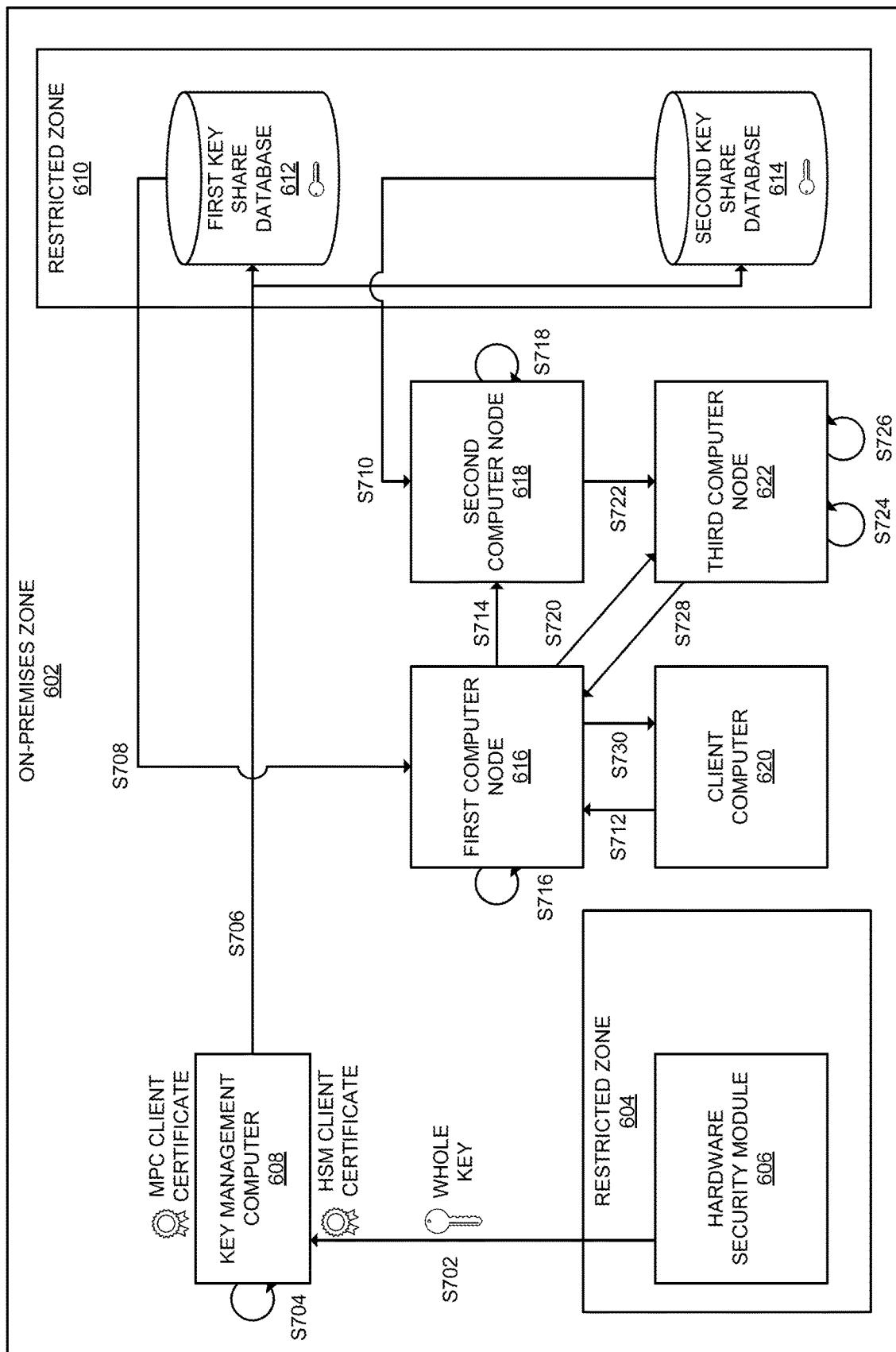
FIG. 6 shows a block diagram of an on-premises key management and multi-party encryption system according to some embodiments.

FIG. 6 shows a system block diagram of an on-premises based key management system according to some embodiments. The system comprises an on-premises zone 602, a restricted zone 604 comprising a hardware security module 606, a key management computer 608, a restricted zone 610 comprising a first key share database 612 and a second key share database 614, a first computer node 616, a second computer node 618, a client computer 620, and a third computer node 622. Also shown in FIG. 6 are a series of steps S702-S730, corresponding to a method of provisioning key shares and performing multi-party cryptography. Steps S702-S730 can be understood with reference to the flowchart of FIG. 7. In FIG. 6, the first computer node 616, second computer node 618, and third computer node 622 are all operating at a same premises (i.e., on-premises zone 602).

In many ways, FIG. 6 is similar to FIG. 4, and much of the description of FIG. 6 (and by extension FIG. 7), will be similar to the descriptions of FIGS. 4 and 5 respectively. Key differences include the fact that the first computer node 616, second computer node 618, and third computer node 622 operate in the on-premises zone rather than in a distributed computing network. Additionally, FIG. 6 does not include a proxy or a firewall. Further, the second restricted zone 610 comprises the first key share databases 612 and 614, which are accessed by the first computer node 616 and second computer node 618 respectively, instead of the first computer node 616 and second computer node 618 storing their respective key shares. The key management computer can pre-provision the key shares to the first key share database 612 and second key share database 614, further reducing utilization of the hardware security module 606. This is possible because risk tolerance is usually higher in on-premises environments, such as on-premises zone 602.

Restricted zone 604 may be a computing zone that is subject to higher security than other parts of on-premises zone 602. Access to computational resources in the restricted zone 604 (i.e., the hardware security module 606) may be restricted to a few trusted entities, including the key management computer 608. Communication with computers and other devices operating within restricted zone 604 may be subject to monitoring or other appropriate security policies, including discretionary and mandatory access control. The restricted zone 604 may be subject to heightened security in order to protect cryptographic keys and other sensitive records stored in hardware security module 606.

Hardware security module 606 may be used to securely store a cryptographic key. The hardware security module 606 may be a physical computing device that is tamper-protected, i.e., the hardware security module 606 may provide tamper evidence, or become inoperable or delete cryptographic keys if it is tampered with. The hardware security module 606 may include one or more secure cryptoprocessing chips, and may be present in a cluster of other hardware security modules. The hardware security module 606 may be accessed by the key management computer 608, in order for the key management computer to retrieve the cryptographic key.

The key management computer 608 may have the ability to extract or import cryptographic keys from the hardware security module 606. The key management computer 608 may have secure communication capabilities that enable it to securely retrieve cryptographic keys from the hardware security module 606. These may include, for example, the capability to mutually authenticate and/or perform client certificate authentication. Additionally, the key management computer 608 may be able to generate a first key share and a second key share from the cryptographic key. The key management computer 608 may possess any appropriate code, instructions or software in order to generate key shares from the cryptographic key. It may also execute software or code that enables the key management computer 608 to perform functions involved in generating the first and second key shares, including generating cryptographically secure random numbers. The key management computer 608 may be able to securely transmit the first and second key shares to a first key share database 612 and a second key share database 614 operating in the restricted zone 610.

Restricted zone 610 may be a computing zone that is subject to higher security. Access to computational resources in the restricted zone 610 (i.e., the first key share database 612 and the second key share database 614) may be restricted to a few trusted entities (e.g., first computer node 616 and second computer node 618). Communications with databases operating within restricted zone 610 may be subject to monitoring or other appropriate security policies, including discretionary and mandatory access control. The restricted zone 610 may be subject to heightened security in order to protect the first and second key share stored in the first key share database 612 and second key share database 614 respectively.

The first key share database 612 and second key share database 614 may be two databases that respectively store the first key share and second key share received from the key management computer. The first key share database 612 and second key share database 614 may be protected by any appropriate security measures, e.g., entities communicating with the key share databases may be subject to client certificate authentication.

The first computer node 616 may interface with client computer 620. The first computer node 616 may receive an initial message from client computer 620, and may generate a garbled circuit for the purpose of encrypting or decrypting the initial message. The first computer node 616 may generate a garbled circuit, garbled message, and garbled key share as part of a three-party Yao protocol. The first computer node 616 may transmit the initial message to the second computer node 618, and may transmit the garbled circuit, garbled message, and garbled key share to the third computer node 622, so that the third computer node 622 can encrypt or decrypt the initial message using the garbled circuit, garbled message, garbled first key share and a garbled second key share received from the second computer node 618. The first computer node 616 may retrieve the first key share from the first key share database 610 rather than store the first key share in its own memory.

Second computer node 618 may receive the initial message from the first computer node 616. The second computer node 618 may generate a garbled message based on the initial message, a garbled second key share, and a garbled circuit, and provide the garbled message, garbled second key share, and garbled circuit to the third computer node 622, in order for the third computer node 622 to encrypt or decrypt the initial message using the garbled circuit and generate a subsequent message. Generally, aside from interfacing with the client computer 620, the second computer node 618 performs similar functions to the first computer node 616, and can generally be understood with reference to FIG. 8 and the description below. The second computer node 618 may retrieve the second key share from the second key share database 612 rather than store the second key share in its own memory.

Client computer 620 may be a client computer or application requesting cryptoprocessing services from first computer node 616. The client computer 620 may possess an initial message that the client computer 620 wants to have encrypted or decrypted. The client computer 620 may provide the initial message to the first computer node 616 and receive a subsequent message, or a derivative of the subsequent message from the first computer node 616. For example, the initial message may be a plaintext message, and the subsequent message may be an encrypted (ciphertext) message corresponding to the plaintext message.

Third computer node 622 may be able to evaluate a garbled circuit using a garbled first key share, a garbled second key share, and a garbled message in order to generate a subsequent message. Additionally, the third computer node 622 may verify that the garbled circuits and garbled messages received from the first computer node 616 and the second computer node 618 are consistent. The third computer node 622 may perform the encryption or decryption operation requested by the client computer 620 using the first and second garbled key shares, but possesses neither of the key shares itself. The third computer node 622 can transmit the subsequent message back to the first computer node, which can ungarble the subsequent message (if necessary) and transmit the result back to the client computer 620. The third computer node 622 is discussed in further detail below with reference to FIG. 9.

Figure 7A:
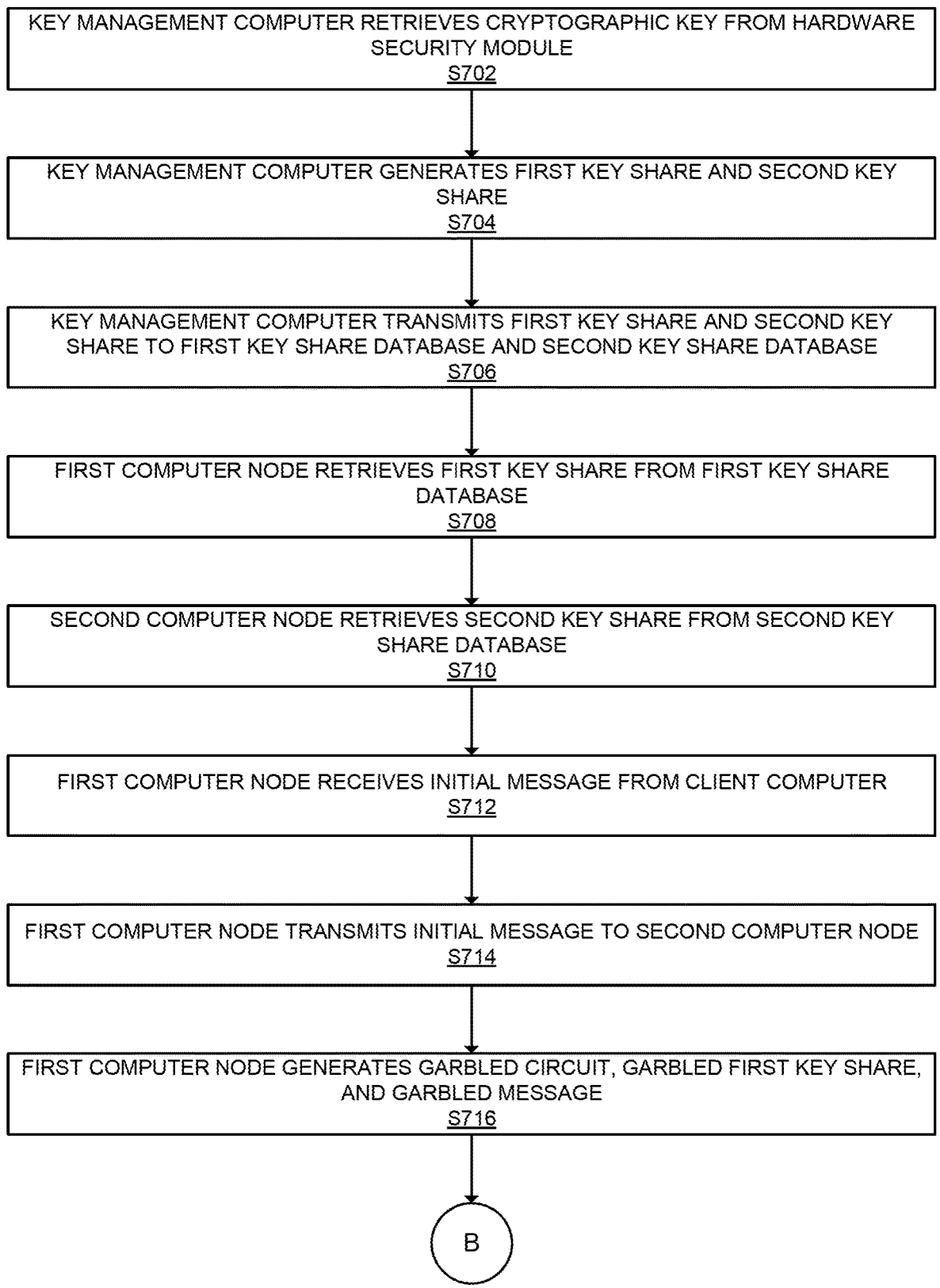
FIGS. 7A and 7B show a flowchart of a method of on-premises key management and multi-party encryption according to some embodiments.

FIG. 7 shows a method of on-premises based key management and multi-party encryption according to some embodiments. The method may also be understood with reference to FIG. 6. Notably, many of the steps of FIG. 7 are similar to steps of FIG. 5.

At step S702, the key management computer 608 can retrieve a cryptographic key stored in a hardware security module 606. In some embodiments, the key management computer 608 may first receive a request for key share provisioning from one or more entities, e.g., the first computer node 616 and second computer node 618, or the first key share database 612 and second key share database 614. The key management computer 608 may verify or authenticate the requestor using a client certificate, e.g., a certificate corresponding to one or more of the computer nodes performing multi-party cryptography (MPC client certificate). The key management computer 608 may additionally verify or authenticate the hardware security module 606, e.g., using an HSM client certificate. After performing any optional verification or authentication steps, the key management computer 608 may retrieve the cryptographic key from the hardware security module 606.

At step S704, the key management computer 608 may generate or form a first key share and a second key from a key (i.e., the cryptographic key) stored in the hardware security module 606. There are a number of ways in which a cryptographic key can be used to generate two or more key shares. As one example, the key management computer 608 may generate a random number using any appropriate cryptographically secure random number generator and use the random number as one of the two key shares (e.g., the first key share). The key management computer 608 may calculate the XOR (exclusive-or) of the first key share and the cryptographic key from the hardware security module 606 and use the XOR of the first key share and the cryptographic key as the second key share. However, any appropriate secret sharing method may be used in order to generate the first and second key shares from the cryptographic key, e.g., Shamir's secret sharing or the Chinese remainder theorem.

At step S706 the key management computer 608 may transmit the first key share and second key share to the first key share database 612 and second key share database 614 respectively. The first computer node 616 and second computer node 618 may retrieve their respective key shares in order to perform multi-party cryptographic operations, and may not have access to the key share corresponding to the other computer node.

At step S708, the first computer node 616 can retrieve the first key share from the first key share database 612 in order to use the first key share as part of a multi-party cryptographic operation.

At step S710, the second computer node 618 can retrieve the second key share from the second key share database 614 in order to use the second key share as part of a multi-party cryptographic operation.

At step S712, the first computer node 616 can receive an initial message from a client computer 620. The initial message may comprise a message that the client computer 620 wants to encrypt or decrypt, e.g., the initial message may be plaintext or ciphertext. The initial message may additionally comprise information about the requested operation, e.g., whether the client computer 620 wants the initial message encrypted or decrypted. The client computer 620 and first computer node 616 may authenticate each other, mutually or otherwise, before the client computer 620 transmits the initial message to the first computer node 616.

At step S714, the first computer node 616 may transmit the initial message to the second computer node 618. In some embodiments, the second computer node 618 may generate a garbled circuit, garbled second key share, and garbled message. In these embodiments, the second computer node 618 may use the initial message to generate the garbled circuit, garbled second key share, and/or garbled message.

At step S716, the first computer node 616 may generate a garbled circuit, a garbled first key share based on the first key share and the garbled circuit, and a garbled message based on the initial message and the garbled circuit. Garbled circuit generation can be accomplished in a number of ways, and the following is intended as a non-limiting example.

The first computer node 616 may possess a template or file that defines a Boolean circuit or an unlabeled garbled circuit that may be used to perform encryption, e.g., a Boolean circuit that implements an encryption or decryption algorithm for the AES cryptosystem. The first computer node 616 may use a random number generator to generate the input and output wire labels corresponding to the garbled circuit. The first computer node 616 may generate the garbled first key share based on the first key share using some of the input wire labels. For example, if the first key share is 256 bits long, the garbled circuit may possess 256 input wires corresponding to the first key share. The garbled first key share may be generated based on the 256 input wire labels corresponding to the first key share. Likewise, the garbled circuit may possess some number of input wires corresponding to the initial message. The garbled message may be generated by determining the input wire labels corresponding to the initial message.

Figure 7B:
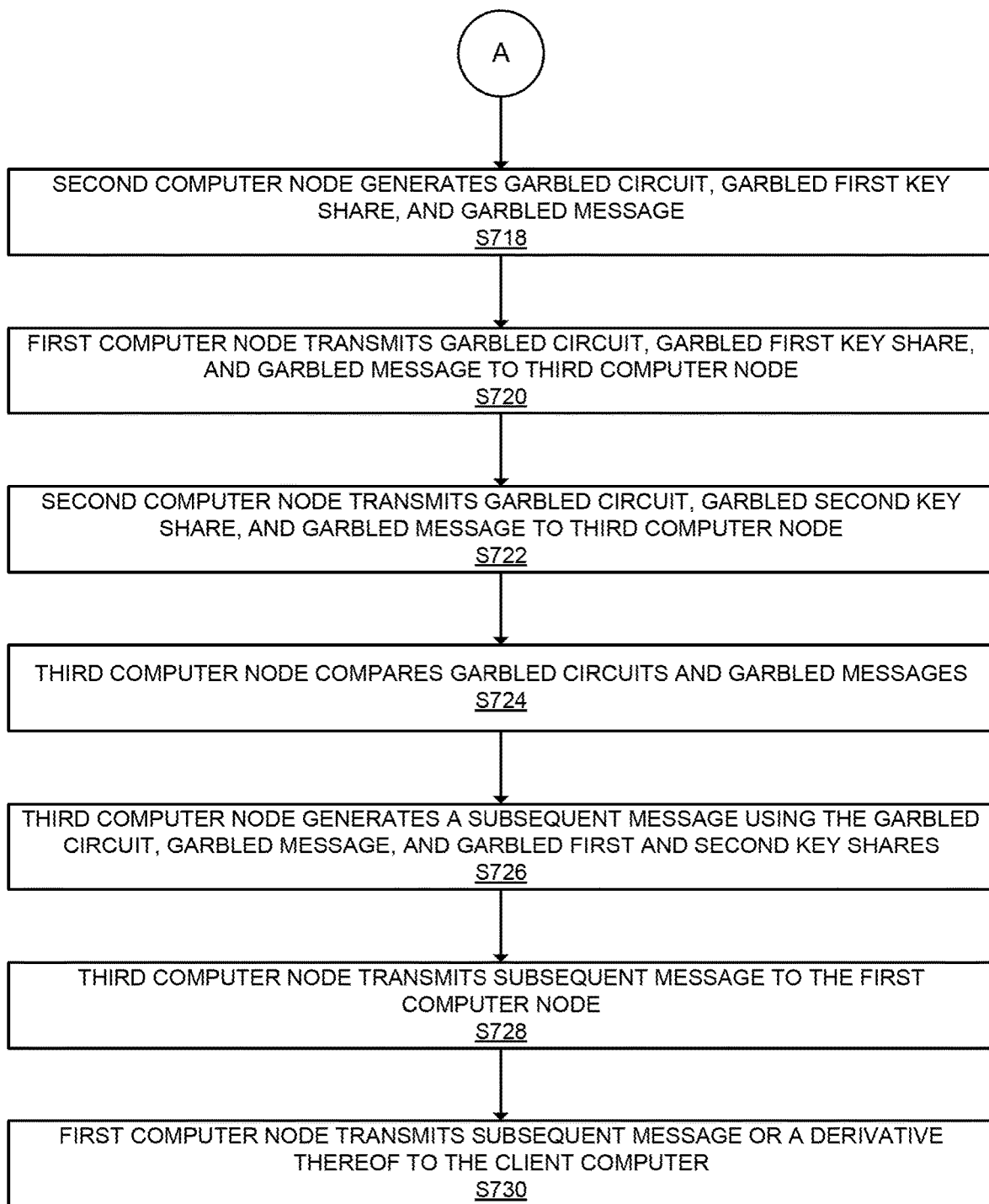

Referring now to FIG. 7B, at step S718, the second computer node 618 may generate a second garbled circuit, a garbled second key share based on the second key share stored in the second key share database 614, and a second garbled message. The second computer node 618 may generate the second garbled circuit, garbled second key share, and second garbled message in substantially the same way as the garbled circuit, garbled first key share, and garbled message were generated by the first computer node 616.

At step S720, the first computer node 616 can transmit the garbled circuit, garbled first key share, and the garbled message to the third computer node 622. In some embodiments, the garbled circuit may be referred to as a first garbled circuit and the garbled message may be referred to as a first garbled message.

At step S722, the second computer node 618 can transmit the second garbled circuit, garbled second key share, and the second garbled message to the third computer node 622.

At step S724, the third computer node 622 may determine that the first garbled circuit and the second garbled circuit match and the first garbled message and second garbled message match. The third computer node 622 may perform this verification in order to determine that the first computer node 616 and second computer node 618 are in agreement over the multi-party cryptographic operation to be performed. The third computer node 622 may verify that the first garbled circuit and the second garbled circuit match and that the first garbled message and second garbled message match using any appropriate method. For example, the third computer node 622 may iterate through the first and second garbled message (and any files or data representing the first and second garbled circuit) and perform a bit-wise or byte-wise comparison in order to verify that the garbled messages and garbled circuits are consistent. Alternatively, the third computer node 622 can compare hashes of the two garbled circuits or garbled messages.

At step S726, the third computer node 622 can generate a subsequent message by inputting the first garbled key share, the second garbled key share, and the garbled message to the garbled circuit. The garbled circuit may comprise a number of input wires corresponding to the first key share, the second key share, and the garbled message. The third computer node 622 may use the labels corresponding to those input wires (i.e., the garbled first key share, the garbled second key share, and the garbled message) in order to decrypt the corresponding output wires, which may be used as labels to decrypt the output wires of successive garbled gates, as described above with reference to FIGS. 2 and 3. The result may be a set of output wire labels that correspond to a subsequent message.

At step S728, the third computer node 622 may transmit the subsequent message to the first computer node 616.

At step S730, the first computer node 616 may transmit the subsequent message or a derivative thereof to the client computer 620. In some embodiments, the subsequent message may be a set of output wire labels corresponding to the output of the garbled encryption or decryption circuit. The first computer node 616 may ungarble the message by replacing the labels with their corresponding Boolean values before transmitting the ungarbled message to the client computer 620. In some embodiments, the subsequent message or the derivative thereof is ciphertext (i.e., the garbled circuit was used to perform encryption). In other embodiments, the subsequent message or the derivative thereof is plaintext (i.e., the garbled circuit was used to perform decryption).

Figure 8:
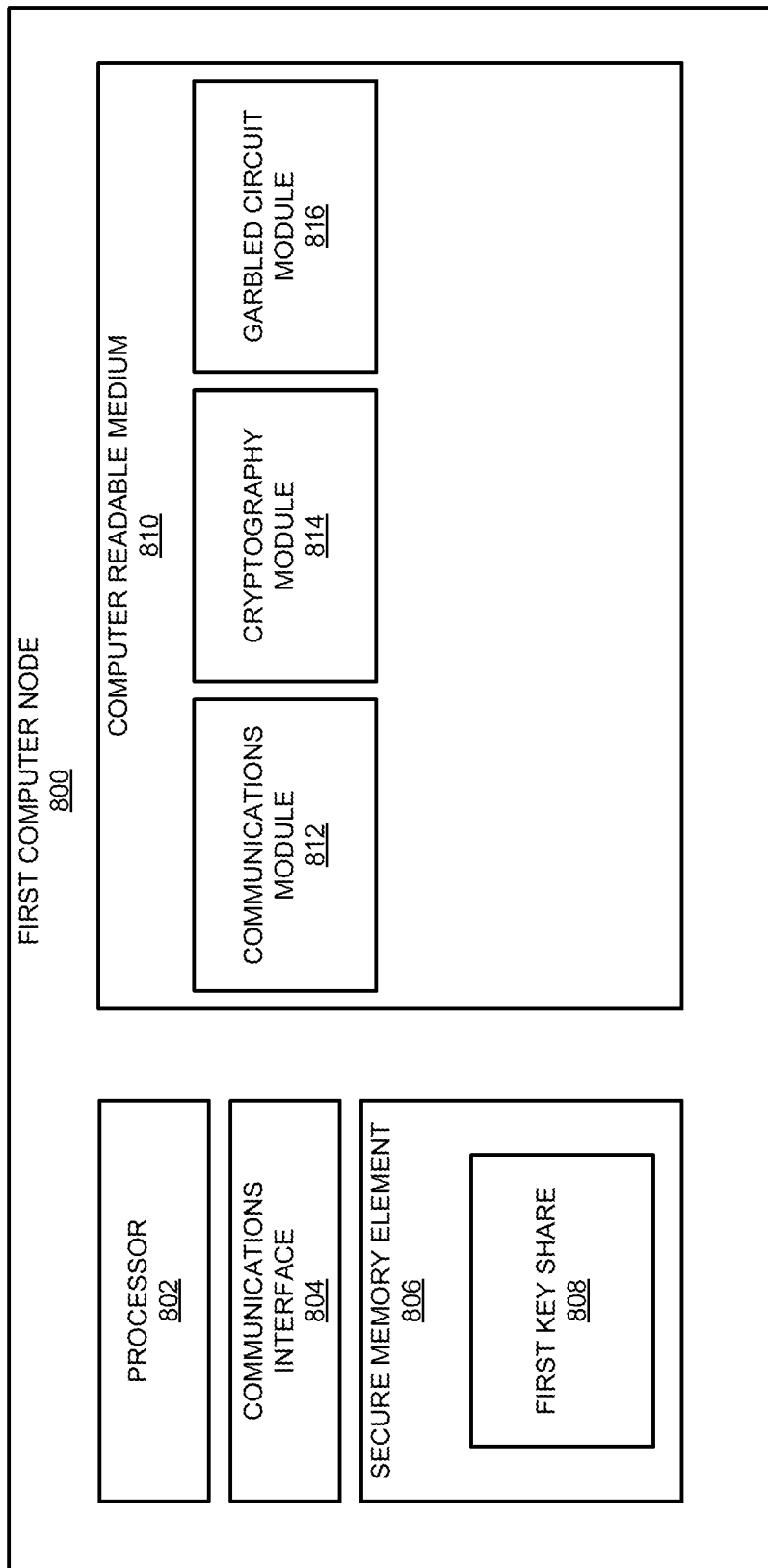
FIG. 8 shows a system block diagram of a first computer node according to some embodiments.

The first computer nodes of FIG. 4 and FIG. 6 may be better understood with reference to FIG. 8, which shows a block diagram of a first computer node 800. The first computer node 800 may comprise a processor 802, a communications interface 804, a secure memory element storing a first key share 808, and a computer readable medium 810 comprising code or other software modules, including a communications module 812, a cryptography module 814, and a garbled circuit module 816.

Processor 802 may be any suitable processing apparatus or device as described in the terms section above. The communications interface 804 may comprise a network interface that enables the first computer node 800 to communicate with other computers or systems over a network such as a distributed computing network, an on-premises network (e.g., a local area network) or a network such as the Internet.

Secure memory element 806 may comprise a memory or computer readable medium that is protected in some way. Data stored on secure memory element 806 may be stored in encrypted form. In some embodiments, secure memory element 806 may comprise a hardware module, separate from computer readable medium 810. In other embodiments, secure memory element 806 may comprise a protected segment of memory from computer readable medium 810. The secure memory element 806 may securely store the first key share 808. The first computer node 800 may retrieve first key share 808 from the secure memory element 806 in order to generate a garbled key share as part of a multi-party encryption process. In some embodiments, the first computer node 800 may not store key share 808, e.g., in on-premises embodiments where first key share 808 is stored in a key share database.

Communications module 812 may comprise code or software, executable by the processor 802 for establishing communication between the first computer node 800 and other entities, including a proxy, a second computer node, a third computer node, a client computer, or a key share database. The first computer node 800 may use the communications module 812 in order to receive data from these entities. This may include, for example, receiving a first key share from a key management computer via the proxy, receiving a first key share from a key share database, receiving an initial message (e.g., an encrypted message) from a client computer, or receiving a subsequent message from the third computer node. The first computer node 800 may additionally use the communications module 812 to transmit data to the second computer node, third computer node, and client computer, for example, the first computer node 800 may receive an initial message from the client computer and transmit the initial message to the second computer node. The first computer node 800 may additionally transmit a garbled circuit, garbled message, and garbled key share to the third computer node, which the third computer node may use in order to encrypt or decrypt the garbled message, generating a subsequent message. The first computer node 800 may also use the communications module 812 to transmit the subsequent message to the client computer. The communications module 812 may include any code or software necessary to establish a secure communication channel. This may include code used to, for example, perform mutual TLS authentication, authenticate client certificates, etc.

Cryptography module 814 may include software or code, executable by the processor 802 for performing cryptographic operations. These cryptographic operations may be operations used in conjunction with the garbled circuit module 816 to generate garbled circuits. For example, cryptography module 814 may comprise code used to generate pseudorandom numbers which may be used as labels for garbled gates in a garbled circuit. As another example, cryptography module 814 may be used to perform encryption or decryption operations as part of generating garbled gates or garbled circuits, such as encrypting labels associated with an output wire using the corresponding input wires as cryptographic keys.

Garbled circuit module 816 may include software or code, executable by the processor for generating garbled circuits, garbled messages, garbled key shares, and for ungarbling messages. The first computer node 800 may use the garbled circuit module 816 to generate a garbled circuit, a garbled first key share, and a garbled message. The first computer node 800 may additionally use the garbled circuit module 816 to ungarble a garbled subsequent message before transmitting the ungarbled subsequent message to the client computer.

Generating a garbled circuit may be accomplished in a number of ways, and the following is intended only as a single non-limiting example. The garbled circuit module 816 may comprise a template file or code that corresponds to a garbled circuit used to perform encryption, e.g., a garbled circuit used to implement AES. The template file may specify the number of garbled gates in the garbled circuit and their interrelation, e.g., the ways in which the input and output wires of different garbled gates are connected to one another. The first computer node 800 may generate the garbled circuit by determining the labels associated with each input and output wire in the template file. The first computer node 800 may use the garbled circuit module 815 and the cryptography module 814 to generate random numbers and assign each generated random number as a label to each input and output wire.

A second computer node (e.g., second computer node 418 from FIG. 4) may generally perform similar operations to the first computer node 800, and may generally be understood with reference to FIG. 8. These operations may include generating garbled values, garbled messages and garbled circuits, among others. The first computer node 800 and a second computer node may be synchronized, such that both computer nodes may generate consistent garbled circuits. This synchronization can be accomplished, for example, by the first computer node 800 and second computer node using a consistent seed value for random number generation.

Figure 9:
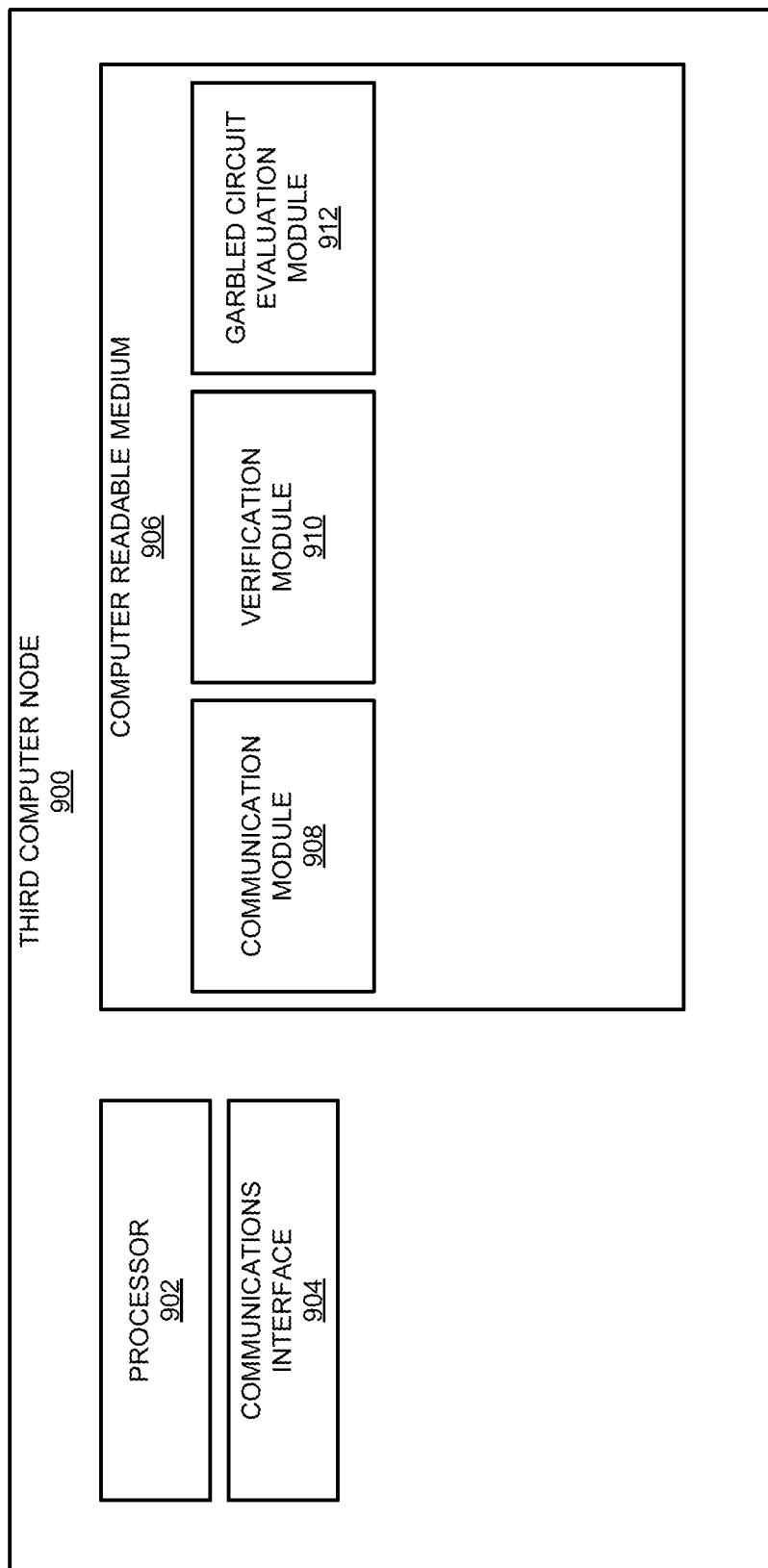
FIG. 9 shows a system block diagram of a second computer node according to some embodiments.

The third computer nodes of FIG. 4 and FIG. 6 may be better understood with the block diagram of a third computer node 900 shown in FIG. 9. The third computer node 900 may comprise a processor 902, a communications interface 904, and a computer readable medium 906. The computer readable medium 906 may comprise a communication module 908, a verification module 910, and a garbled circuit evaluation module 912.

Processor 902 may be any suitable processing apparatus or device as described in the terms section above. The communications interface 904 may comprise a network interface that enables the third computer node 902 to communicate with other computers or systems over a network such as a distributed computing network, an on-premises network (e.g., a local area network) or a network such as the Internet.

Communication module 908 may comprise code or software, executable by the processor 902, for establishing communication between the third computer node 900 and other entities, including the first computer node and the second computer node. The third computer node 900 may use the communications module 912 in order to receive data from these entities. This may include, for example, receiving a first garbled circuit, a garbled first key share, and a first garbled message from the first computer node, and receiving a second garbled circuit, a garbled second key share, and a second garbled message from the second computer node. The third computer node 900 may additionally use the communication module 908 to transmit subsequent messages, generated during a multi-party cryptographic operation, to the first computer node.

Verification module 910 may comprise code or software, executable by processor 902 for verifying garbled circuits and garbled messages. In some embodiments, the third computer node 900 may receive a first garbled circuit and a first garbled message from the first computer node and a second garbled circuit and a second garbled message from the second computer node. The third computer node 900 may use the verification module 910 in order to verify that the first and second garbled messages match and that the first and second garbled circuits match, indicating that the first computer node and second computer node are in agreement regarding the multi-party cryptographic operation to be preformed. The verification module 910 may comprise code enabling any appropriate method of comparison or verification. For example, the verification module 910 may comprise code, executable by the processor 902 for iterating though the first and second garbled messages and performing a bit-wise or byte-wise comparison in order to verify that the messages are identical. The verification module 910 may also comprise code for performing a similar comparison on the first garbled circuit and second garbled circuit.

Garbled circuit evaluation module 912 may comprise code, executable by the processor 902, for evaluating garbled circuits. These may include garbled circuits used to perform multi-party encryption. The third computer node may input a first garbled key share, a second garbled key share, and a first or second garbled message into a garbled circuit in order to generate a subsequent message. The subsequent message may be garbled or ungarbled, and may correspond to the first or second garbled message. For example, the garbled message may correspond to a plaintext initial message, and the subsequent message may correspond to a ciphertext message. The garbled circuit evaluation module 912 may comprise any code or software necessary in evaluating garbled circuits. For example, garbled circuit evaluation module 912 may comprise cryptoprocessing functions that enable the third computer node 900 to decrypt output wire labels using the corresponding input wire labels.

Further details regarding garbled circuits and encryption can be found in PCT/US2017/049722, filed on Aug. 31, 2017, which is herein incorporated by reference in its entirety.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
   receiving, by a first computer node, a first key share from a key management computer;
   receiving, by the first computer node, an initial message from a client computer;
   transmitting, by the first computer node, the initial message to a second computer node;
   generating, by the first computer node, a first garbled circuit, a garbled first key share based on the first key share and the first garbled circuit, and a garbled message based on the initial message and the first garbled circuit;
   transmitting, by the first computer node to a third computer node, the first garbled circuit, the garbled first key share, and the garbled message, wherein the third computer node also receives, from the second computer node, a garbled second key share based on a second key share stored at the second computer node and a second garbled circuit,
   which causes the third computer node to generate a subsequent message by inputting the first garbled key share, the second garbled key share, and the garbled message into either the first garbled circuit or the second garbled circuit, and transmit the subsequent message to the first computer node; and
   transmitting, by the first computer node, the subsequent message or a derivative thereof to the client computer.

2. The method of claim 1, wherein the garbled message is a first garbled message and wherein the third computer node also receives from the second computer node, a second garbled message based on the initial message and the second garbled circuit.

3. The method of claim 2, wherein the third computer node determines that the first garbled circuit and the second garbled circuit match and the first garbled message and the second garbled message match.

4. The method of claim 1, further comprising:
   generating, by the first computer node, an ungarbled subsequent message based on the subsequent message and the first garbled circuit.

5. The method of claim 1, wherein the initial message is plaintext and the subsequent message or the derivative thereof is ciphertext.

6. The method of claim 1, wherein the key management computer generated the first key share from a key stored in a hardware security module.

7. The method of claim 1, wherein the key management computer forms the first key share and the second key share.

8. The method of claim 1, wherein the first computer node, the second computer node, and the third computer node are all present at a same premises.

9. The method of claim 1, wherein the first computer node, the second computer node, and the third computer node are part of a distributed computing network.

10. A first computer node comprising:
a processor; and
a non-transitory computer readable medium coupled to the processor, the non-transitory computer readable medium comprising code, executable by the processor, for implementing a method comprising:
receiving a first key share from a key management computer;
receiving an initial message from a client computer;
transmitting the initial message to a second computer node;
generating a first garbled circuit, a garbled first key share based on the first key share and the first garbled circuit, and a garbled message based on the initial message and the first garbled circuit;
transmitting to a third computer node, the first garbled circuit, the garbled first key share, and the garbled message, wherein the third computer node also receives, from the second computer node, a garbled second key share based on a second key share stored at the second computer node and a second garbled circuit, which causes the third computer node to generate a subsequent message by inputting the first garbled key share, the second garbled key share, and the garbled message into either the first garbled circuit or the second garbled circuit, and transmit the subsequent message to the first computer node; and
transmitting the subsequent message or a derivative thereof to the client computer.

11. The first computer node of claim 10, wherein the garbled message is a first garbled message and wherein the third computer node also receives from the second computer node, a second garbled message based on the initial message and the second garbled circuit.

12. The first computer node of claim 11, wherein the third computer node determines that the first garbled circuit and the second garbled circuit match and that the first garbled message and the second garbled message match.

13. The first computer node of claim 10, wherein the method further comprises:
generating an ungarbled subsequent message based on the subsequent message and the first garbled circuit.

14. The first computer node of claim 10, wherein the initial message is plaintext and the subsequent message or the derivative thereof is ciphertext.

15. The first computer node of claim 10, wherein the key management computer generated the first key share from a key stored in a hardware security module.

16. The first computer node of claim 10, wherein the key management computer formed the first key share and the second key share.

17. The first computer node of claim 10, wherein the first computer node, the second computer node, and the third computer node are all present at a same premises.

18. A method comprising:
receiving, by a third computer node, from a first computer node, a first garbled circuit, a garbled first key share, and a first garbled message;
receiving, by the third computer node, from a second computer node, a second garbled circuit, a garbled second key share and a second garbled message;
generating, by the third computer node, a subsequent message by inputting the first garbled key share, the second garbled key share, and the first or the second garbled message into either the first garbled circuit or the second garbled circuit; and
transmitting, by the third computer node, the subsequent message to the first computer node.

19. The method of claim 18, further comprising verifying, by the third computer node, that the first garbled circuit and the second garbled circuit match and that the first garbled message and the second garbled message match.

20. The method of claim 18, wherein the first computer node ungarbles the subsequent message and transmits the subsequent message to a client computer.

* * * * *